Aug. 28, 1923.

P. A. KOCH

DYNAMO ELECTRIC MACHINE

Filed May 9, 1922

1,466,304

Inventor.
Paul A. Koch,
by
His Attorney.

Patented Aug. 28, 1923.

1,466,304

UNITED STATES PATENT OFFICE.

PAUL AUGUST KOCH, DECEASED, LATE OF CHARLOTTENBURG, GERMANY, BY AUGUSTE ELSBETH KOCH, ADMINISTRATRIX, OF CHARLOTTENBURG, GERMANY, ASSIGNOR TO GENERAL ELECTRIC COMPANY, A CORPORATION OF NEW YORK.

DYNAMO-ELECTRIC MACHINE.

Application filed May 9, 1922. Serial No. 559,593.

*To all whom it may concern:*

Be it known that PAUL AUGUST KOCH, deceased, late of Charlottenburg, Germany, during his lifetime invented certain new and useful Improvements in Dynamo-Electric Machines, and that I, AUGUSTE ELSBETH KOCH, widow of the said PAUL AUGUST KOCH, do hereby declare, to the best of my knowledge and belief, that the following specification, taken in connection with the drawings furnished and forming a part of the same, is a clear, true, and complete description of said improvements.

The invention relates to dynamo electric machines, and has for its object a novel arrangement of the magnetic structure of such machines, whereby the effective flux varies within any desired range substantially in proportion to the ampere turns producing it.

The magnetic structure of dynamo electric machines, as usually constructed, has a magnetic characteristic which bends or is curved, that is, the flux which is effective in producing magnetization of the armature varies in direct proportion with the ampere turns producing it only on the low part of the magnetization curve, whereas the flux increases much slower than the ampere turns on that part of the magnetization curve on which the machine usually operates. In a machine having this usual magnetic structure, the field, in case of variation in the voltage applied thereto, does not vary in proportion to the voltage, and consequently, the speed of such a machine if operated as a motor would vary with the voltage applied to the terminals thereof, and the voltage of such a machine if operated as a generator would vary with the speed of the machine.

In accordance with the invention, is provided the magnetic structure of a dynamo electric machine with an air gap other than that between the armature and field poles, and also shunt a portion of the magnetic flux of the field poles away from the armature. With a machine built in accordance with the invention, the effective field or flux varies substantially in direct proportion to the voltage, and consequently the speed of such a machine if operated as a motor would remain substantially constant over a wide range of voltage applied to the terminals thereof, and the voltage of such a machine if operated as a generator would remain substantially constant over a wide range of speed of the machine.

Figure 1:
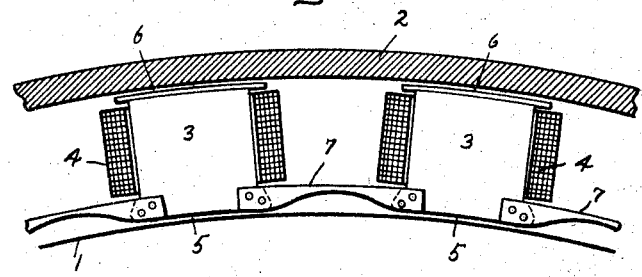
Figure 2:
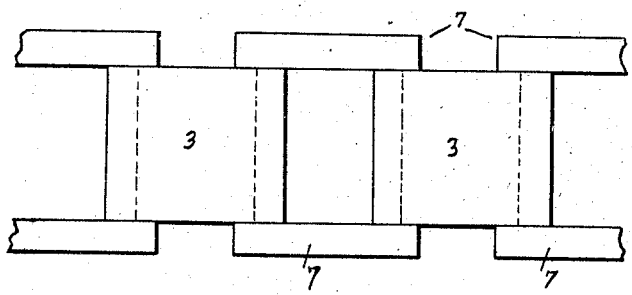

For a better understanding of the invention, reference may be had to the following description taken in connection with the accompanying drawing, in which Fig. 1 is a sectional view of a part of a dynamo electric machine embodying the invention, and Fig. 2 is a view of the field structure of Fig. 1 looking upwardly.

Referring to the drawing, 1 is the armature surrounded by a field magnet structure comprising a magnet frame 2 and pole pieces 3. The pole pieces are shown as provided with field coils 4. There is the usual air gap 5 between the armature and pole pieces and an additional air gap 6 in the magnetic circuit, which has been shown between the magnet frame 2 and the pole pieces 3. Magnetic shunts 7 are provided for shunting a portion of the magnetic flux of the pole pieces away from the armature. These magnetic shunts or members 7 connect the pole pieces and are adjacent the armature. The magnetic circuit of the magnetic members 7 includes the air gap 6, but not the air gap 5. By means of this arrangement of air gaps and magnetic shunts, it is possible to make the magnetic flux through the armature substantially proportional to the ampere turns producing it, within any desired range. By suitably proportioning the air gaps and magnetic shunts, the magnetic conditions may be varied through wide limits.

My invention is particularly applicable to a dynamo electric machine operating as a shunt or flat compounded motor or generator. If such a motor is operated on a circuit the voltage of which varies over wide limits, its speed would remain substantially constant. If such a generator is driven at variable speed, the voltage generated by it would be substantially constant.

It should be understood that the invention has other applications, and that various modifications may be made therein which do not depart from the spirit and scope of the invention as set forth in the following claims.

What is claimed and sought to be secured by Letters Patent of the United States, is,—

1. In a dynamo electric machine, an armature, a field magnet structure comprising a magnet frame and pole pieces and having an air gap in the magnetic circuit other than that between said field poles and armature, and means for shunting a portion of the magnetic flux of said pole pieces away from said armature.

2. In a dynamo electric machine, an armature, a field magnet structure comprising a magnet frame and pole pieces and having an air gap in the magnetic circuit other than that between said field poles and armature, and magnetic members connecting said pole pieces, said magnetic members being adjacent said armature and shunting a portion of the magnetic flux of said pole pieces away from said armature.

3. In a dynamo electric machine, an armature, a field magnet structure comprising a magnet frame and pole pieces and an air gap between said frame and pole pieces, and means for shunting a portion of the magnetic flux of said pole pieces away from said armature.

4. In a dynamo electric machine, an armature, a field magnet structure comprising a magnet frame and pole pieces and having an air gap between said frame and pole pieces and magnetic members connecting said pole pieces, said magnetic members being adjacent said armature and shunting a portion of the magnetic flux of said pole pieces away from said armature.

In witness whereof, I have hereunto set my hand this twenty-first day of April, 1922.

AUGUSTE ELSBETH KOCH,
*Administratrix of Paul August Koch, deceased.*